Oct. 20, 1970 M. HUGYECZ 3,535,461

BUSY DETECTOR CIRCUIT FOR STEP-BY-STEP TELEPHONE EXCHANGE

Filed Dec. 15, 1967

INVENTOR
MATYAS HUGYECZ

BY Hoffman Stone

ATTORNEY

United States Patent Office
3,535,461
Patented Oct. 20, 1970

3,535,461
BUSY DETECTOR CIRCUIT FOR STEP-BY-STEP TELEPHONE EXCHANGE

Matyas Hugyecz, Rochester, N.Y., assignor to Stromberg-Carlson Corporation, Rochester, N.Y., a corporation of Delaware Filed Dec. 15, 1967, Ser. No. 690,955
Int. Cl. H04m 3/22
U.S. Cl. 179—18 2 Claims

ABSTRACT OF THE DISCLOSURE

A circuit arrangement for controlling the energization of so-called busy detector relays in a step-by-step telephone switching system of the type including register-senders and access relay sets, and in which the occurrence of a busy condition must be recognized by actuation of a busy detector relay in the access relay set whenever the hunting contacts of a selector in the onward switching hierarchy reach the overflow contacts of the selector. The busy detector is arranged in a bridge type circuit with one of the hunting contacts of the selector that is hunting at any given moment in series in one arm. Until the selector reaches its overflow position, the one contact remains connected directly to one terminal of the battery of the exchange, and the balance of the bridge is such that the busy detector relay is held dropped out. When the selector reaches its overflow position, the contact is switched to change the balance of the bridge so as to actuate the relay.

BRIEF SUMMARY OF THE INVENTION

This invention relates to a novel circuit arrangement for energizing so-called busy detector relays in access relay sets of the kind used in step-by-step telephone switching systems in conjunction with register-senders, and, more particularly, to a circuit arrangement of this type which ensures positive actuation of the busy detector relays.

Heretofore, the usual practice in switching systems of the stated type was simply to connect the busy detector relays in a normally open circuit which was closed by the hunting contact of an onward selector when the selector reached its overflow position. The circuit was closed through one winding of the output transformer of the busy tone generator of the exchange, and failures would occur at times when it became necessary to energize several busy detector relays simultaneously or while busy tone was being fed to other lines. The voltage drop across the output transformer would become excessive, and certain ones of the busy detector relays would either drop out or fail to pick up. The resistance of the transformer winding became a limiting factor, with the result that during overload periods, the switching system was subject to breakdown and the desired operation of the exchange was disrupted at times when it caused maximum inconvenience.

The circuit of the invention makes use of the Wheatstone bridge principle. One hunting contact of the momentarily hunting selector in the onward switching hierarchy is normally connected directly to one terminal, typically the grounded positive terminal, of the battery of the exchange. When the selector reaches its overflow position, the contact is switched to be connected to the battery terminal through the output transformer of the busy tone generator in series with an auxiliary resistor. The added resistance between the contact and the battery terminal changes the balance of the bridge to cause the busy detector relay to pick up.

The arrangement creates a spiralling, instead of a decaying effect. If busy conditions are found in several calls simultaneously, the effective bridge for each busy detector is driven further toward its relay operating condition than is the case when only a single busy condition is found.

DETAILED DESCRIPTION

Figure 1:
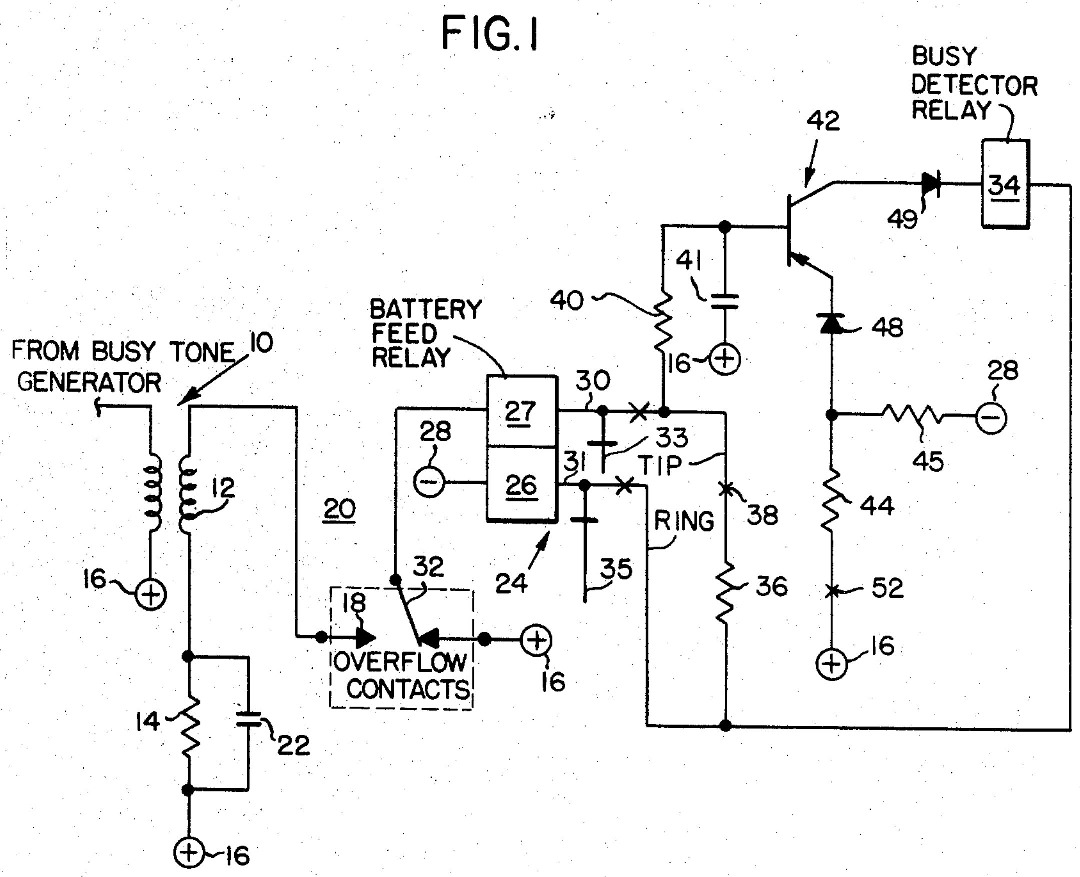
Figure 2:
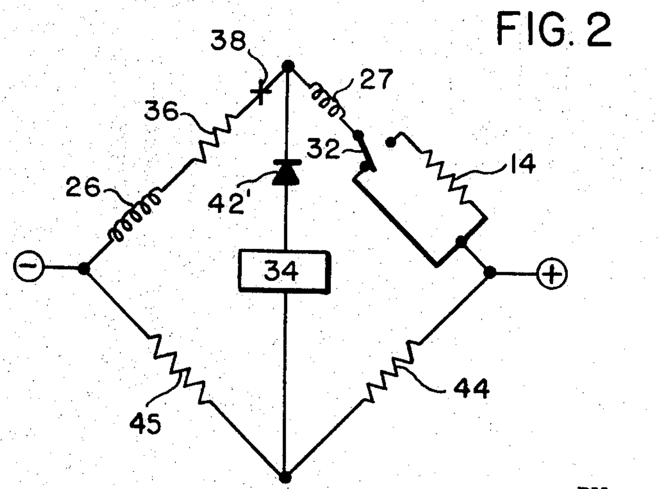

A presently preferred embodiment of the invention will new be described in connection with the accompanying drawing, wherein:

FIG. 1 is a schematic circuit diagram showing the essential arrangement of a busy detector relay circuit according to the invention; and FIG. 2 is a schematic circuit diagram illustrating the theory of operation of the invention.

Referring now to the drawing, the circuit shown in FIG. 1 includes a conventional busy tone output transformer 10 having its secondary winding 12 connected through a resistor 14 to the positive terminal 16 of the exchange battery, which is usually grounded. The opposite terminal of the secondary winding 12 is connected to fixed overflow contacts 18 in the group of selectors 20 to be serviced by the busy tone generator through the transformer 10. The resistor 14 is bypassed by a capacitor 22 to permit flow of the A.C. busy tone without significant hindrance by the resistor 14.

A conventional battery feed relay 24 is included in the line circuit (not shown) of the subscriber being served, and includes first and second windings 26 and 27, respectively. The first winding 26 is connected between the negative battery terminal 28 and the conductor 31 designated the Ring conductor. The second winding 27 is connected between the Tip conductor 30 and a hunting contact 32 in the selector that is hunting at any given moment during the routing of a call. Normally, in the absence of a busy condition, the hunting contact 32 is to the right, as shown, and connects the winding 27 to the positive battery terminal 16.

The Tip and Ring conductors 30 and 31, respectively, are arranged for connection to the subscriber's Tip and Ring leads 33 and 35, respectively, through the conventional relay contacts shown but not separately designated.

The circuit for controlling energization of the busy detector relay 34 is connected across the Tip and Ring leads 30 and 31, and also includes a resistor 14 connected in series between the output winding 12 of the busy tone output transformer 10 and the positive battery terminal 16. The busy tone signal is shunted across the resistor 14 by a capacitor 22, and is not significantly attenuated by the resistor 14.

A transistor 42 is connected as a gate with its collector-to-emitter circuit path in series with the busy detector relay 34, and with its base connected through a resistor 40 to the Tip lead 30. The emitter of the transistor is connected to a point of fixed potential at the junction between two resistors 44 and 45 that are connected in series across the battery of the exchange. The collector of the transistor 42 is connected through a protective diode 49 to one terminal of the actuating coil of the busy detector relay 34. The opposite terminal of the actual coil of the busy detector relay 34 is connected directly to the Ring lead 31. An additional resistor is connected between the Tip and Ring leads 30 and 31 in series with a pulsing contact 38 of a dial pulse responsive relay (not shown). Another contact 52 of the dial pulse responsive relay is connected in series with the resistors 44 and 45 to assure against unwanted pick-up of the busy detector relay during the individual dial pulses.

A filter comprising a resistor 40 and a capacitor 41 is connected between the Tip lead 30 and the positive battery terminal to make the transistor 42 insensitive to transients and momentary line voltage surges.

The hunting contact 32 is arranged to be connected directly to the positive battery terminal 16 at all of the principal positions of the selector, and to be switched to the output winding 12 of the busy tone transformer when the selector moves to its overflow position. The biasing voltages on the transistor 42 are selected so that the transistor 42 remains cut off so long as the hunting contact 32 is connected directly to the positive battery terminal 16. When the hunting contact 32 arrives at the overflow position, the resistor 14 is placed in series between the base of the transistor 42 and the positive battery terminal 16. The base is driven in a negative direction, and the transistor 42 is turned on, causing the busy detector relay 34 to pick up.

The change in bias applied to the base of the transistor 42 is affected by the number of busy detector relays 34 that must be energized simultaneously and by the number of lines being fed busy tone at the moment, and the effect is in the direction to increase the change, to provide an increasingly negative, or ON, bias as the current through the winding 12 of the transformer is increased. The energy for holding the relays 34 picked up is drawn for each relay 34 individually through its separate voltage divider network comprising the resistors 44 and 45 connected across the battery, and not through the output transformer 10 of the common busy tone generator.

The circuit may be likened to a Wheatstone bridge as shown in FIG. 2, with the voltage dividing resistors 44 and 45 constituting two of the arms connected in series between the terminals 16 and 28 of the battery. The third arm consists of the first winding 26 of the battery feed relay in series with the resistor 36 connected across the Tip and Ring leads. The fourth arm, which is in series with the third arm between the battery terminals 16 and 28, comprises the second winding 27 of the battery feed relay, the hunting contact 32, and the series resistor 14. In its principal positions, the hunting contact 32 shunts the resistor 14, and connects the winding 27 directly to the positive battery terminal 16. In its overflow position, the contact 32 connects the resistor 14 in series with the winding 27, thereby changing the equilibrium condition of the bridge. The transistor 42 is indicated schematically as a simple diode 42' in series with the busy detector relay 34 across the complementary corners of the bridge from the battery.

The diodes 48 and 49 shown in series with the emitter and collector, respectively, of the transistor 42 are not essential to the operation of the circuit, but are intended to protect the transistor against reverse biasing such as may occur when the circuit is connected in systems using reverse battery supervision.

What is claimed is:

1. A busy detector circuit for use in a telephone exchange of the step-by-step type including plural register-senders and access relay sets cooperatively arranged with the register-senders, the exchange including a busy tone generator serving plural lines through a common output transformer, and each of the access relay sets including a busy detector relay, said circuit comprising:

(a) a resistor connected between the output winding of the output transformer of the busy tone generator and the positive terminal of the battery of the exchange, (b) means connecting selected fixed overflow contacts of the selector switches in the exchange to the terminal of the output winding of the output transformer opposite from the terminal to which said resistor is connected, (c) means connecting all principal fixed contacts of the seelctor switches in the same rows as said selected overflow contact directly to the positive battery terminal, (d) a resistor connected in series between the hunting contacts engageable with said selected overflow and said principal fixed contacts and the negative battery terminal, and (e) means including a voltage responsive switching device connected between said hunting contacts and the negative battery terminal for alternately energizing and deenergizing the busy detector relay responsively to changes of potential at said hunting contacts.

2. A busy detector circuit according to claim 1, wherein said energizing and deenergizing means includes a transistor, means applying a fixed bias voltage to the emitter of said transistor, means connecting the base of said transistor to said hunting contacts, and means connecting the busy detector relay in series between the collector of said transistor and the negative battery terminal.

References Cited

UNITED STATES PATENTS 3,247,325 4/1966 Han et al.

KATHLEEN H. CLAFFY, Primary Examiner

T. W. BROWN, Assistant Examiner